(12) United States Patent
Engineer (10) Patent No.: US 10,657,406 B2
(45) Date of Patent: May 19, 2020

(54) OPTICAL CHARACTER RECOGNITION TEXT EXPORT FROM VIDEO PROGRAM

(71) Applicant: The DIRECTV Group, Inc., El Segundo, CA (US)

(72) Inventor: Hiten Engineer, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 82 days.

(21) Appl. No.: 15/422,861

(22) Filed: Feb. 2, 2017

(65) Prior Publication Data

US 2018/0218234 A1  Aug. 2, 2018

(51) Int. Cl.
G06K 9/34 (2006.01)
G06K 9/00 (2006.01)
G06K 9/32 (2006.01)

(52) U.S. Cl.
CPC ....... G06K 9/3266 (2013.01); G06K 2209/01 (2013.01)

(58) Field of Classification Search
CPC .. G06K 9/344; G06K 9/00711; G06K 9/3266; G06K 2209/01; H04N 21/4722; H04N 21/41407; H04N 21/4143; H04N 21/4348; H04N 21/44008;
(Continued)

(56) References Cited

U.S. PATENT DOCUMENTS 5,262,860 A 11/1993 Fitzpatrick et al.
5,570,295 A 10/1996 Isenberg et al.
5,898,919 A 4/1999 Yuen
(Continued)

FOREIGN PATENT DOCUMENTS

EP 2 091 222 8/2009
GB 2 309 853 11/1999
(Continued)

OTHER PUBLICATIONS

Arai, Kohei and Tolle, Herman. "Text Extraction from TV Commercial usingBlob Extraction Method." International Journal of Research and Reviews in Computer Science (IJRRCS) vol. 2, No. 3, Jun. 2011. https://www.researchgate.net/profile/Herman_Tolle/publication/251422301_Text_Extraction_from_TV_Commercial_using_Blob_Extraction_Method/links/571df1de08aefa6488997f0b.pdf.
(Continued)

*Primary Examiner* — Kim Y Vu
*Assistant Examiner* — Michael J Vanchy, Jr (57) ABSTRACT

Devices, computer-readable media, and methods for exporting text captured from a video program presented on a display screen using optical character recognition to an alternate destination are disclosed. For example, a processor may present a video program via a display screen, receive, from a control device associated with the display screen, a request to capture text from the video program, and identify text from a frame of the video program via optical character recognition. When the text from the frame is identified via optical character recognition, the processor may present, via the display screen, the text in a selectable format, receive, from the control device, a selection of at least a portion of the text that is presented in the selectable format, and send the at least the portion of the text to an alternate destination in accordance with the selection of the at least the portion of the text.

18 Claims, 4 Drawing Sheets

(58) Field of Classification Search
CPC ..... H04N 21/440236; H04N 21/47205; H04N 21/84; G06F 17/2264; G06F 17/24
See application file for complete search history.

(56) References Cited

U.S. PATENT DOCUMENTS

| | | | |
|---|---|---|---|
| 6,204,842 B1 | 3/2001 | Fujii | |
| 6,477,508 B1 | 11/2002 | Lazar et al. | |
| 6,941,574 B1 | 9/2005 | Broadwin et al. | |
| 7,197,708 B1 | 3/2007 | Frendo et al. | |
| 7,409,437 B2 | 8/2008 | Ullman et al. | |
| 7,478,240 B1 | 1/2009 | August et al. | |
| 7,552,193 B2 | 6/2009 | Carro | |
| 7,689,613 B2 | 3/2010 | Cadelore | |
| 7,765,575 B2 | 7/2010 | Zigmond | |
| 8,161,172 B2 | 4/2012 | Reisman | |
| 8,291,465 B2 | 10/2012 | Sussman | |
| 8,312,497 B2 | 11/2012 | Pearson et al. | |
| 8,599,309 B2* | 12/2013 | Kikinis | G06K 9/2054 348/468 |
| 8,726,326 B1 | 5/2014 | Harris | |
| 8,983,191 B2 | 3/2015 | Robinson et al. | |
| 9,210,478 B2 | 12/2015 | LaFreniere et al. | |
| 9,462,350 B1 | 10/2016 | Clayton | |
| 2003/0098869 A1 | 5/2003 | Arnold et al. | |
| 2004/0015539 A1* | 1/2004 | Alegria | G06F 17/2264 709/203 |
| 2008/0066097 A1 | 3/2008 | Park et al. | |
| 2011/0241985 A1* | 10/2011 | Hill | G06F 3/017 345/157 |
| 2011/0321107 A1* | 12/2011 | Banks | H04N 21/234363 725/110 |
| 2012/0093415 A1* | 4/2012 | Robinson | G06K 9/3266 382/182 |
| 2013/0007827 A1* | 1/2013 | Adam | H04N 21/4126 725/112 |
| 2013/0177295 A1* | 7/2013 | Cath | H04N 5/44543 386/241 |
| 2015/0189347 A1* | 7/2015 | Oztaskent | H04N 21/2665 725/32 |

FOREIGN PATENT DOCUMENTS

| | | |
|---|---|---|
| WO | WO 01/73525 | 10/2001 |
| WO | WO 02/05568 | 1/2002 |

OTHER PUBLICATIONS

Duan, Ling-Yu et al. "Digesting Commercial Clips from TV Streams." IEEE 2008. http://124.207.250.90/staff/lingyu/IEEE-MM-Com2008.pdf.

"ConTEXTract™ Video OCR." sri.com. Oct. 10, 2016. http://web.archive.org/web/20161010153501/https://www.sri.com/engage/products-solutions/contextract-video-ocr.

Sato, Toshio, et al. "Video OCR for digital news archive." Content-Based Access of Image and Video Database, 1998, Proceedings, 1998 IEEE International Workshop, IEEE, 1998. http://www-preview.ri.cmu.edu/pub_files/pub4/sato_toshio_1998_1/sato_toshio_1998_1.pdf.

Jonsson, Morten, and Hans-Heinrich Bothe. "OCR Algorithm for Detection of Subtitles in Television and Cinema." CVHI. 2007. https://pdfs.semanticscholar.org/5db3/fc90b3fc489824dad9fa9881cd532307e5b2.pdf.

* cited by examiner

OPTICAL CHARACTER RECOGNITION TEXT EXPORT FROM VIDEO PROGRAM

The present disclosure relates generally to the presentation of video programs, and more particularly to devices, non-transitory computer-readable media, and methods for exporting text captured from a video program presented on a display screen using optical character recognition to an alternate destination.

BACKGROUND

Television service providers offer a number of options to subscribers for obtaining and presenting video programs. For example, a subscriber may view video programs that are provided by various content sources and broadcast by a television service provider. In addition, a subscriber may stream or download a video program in connection with a video on demand (VoD) service of the television service provider to a set top box for presentation on a television, or to a second screen, e.g., another subscriber device, such as a personal computer, a smart phone, a computing tablet, and so forth. A subscriber may also stream or download video programs from another entity, e.g., an over the top (OTT) provider, a video hosting web server, and so forth. In addition, a subscriber may record video programs to a digital video recorder (DVR) or to another subscriber device, where the video programs may be broadcast by the television service provider, or which may be purchased, rented, or rights otherwise obtained by the subscriber. The subscriber may then play back the recorded video programs at the subscriber's convenience.

SUMMARY

In one example, the present disclosure describes a device, computer-readable medium and method for exporting text captured from a video program presented on a display screen using optical character recognition to an alternate destination. For instance, in one example, a processor may present a video program via a display screen, receive, from a control device associated with the display screen, a request to capture text from the video program, and identify text from a frame of the video program via optical character recognition. When the text from the frame is identified via optical character recognition, the processor may present, via the display screen, the text from the frame in a selectable format, receive, from the control device, a selection of at least a portion of the text that is presented in the selectable format, and send the at least the portion of the text to an alternate destination in accordance with the selection of the at least the portion of the text.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various options are available for a user to present video programs. This includes video programs stored on a physical medium, broadcast, or streamed over one or more networks to set-top boxes, televisions, and so forth. In one example, the present disclosure enables a user to export text displayed on a display screen to an alternate destination, such as a mobile phone, tablet, laptop or personal computer, etc. Currently, when a user is watching a television program and comes across interesting text information, such as a web address of a product appearing in an advertisement, the user must remember the address and manually enter the web address on a network-connected device. Similarly, a user must typically write down or try to remember a telephone number, an email address, a hashtag, a social media identifier, or other contact identifier that appears in a video program before calling or sending a message directed to such a contact identifier. In addition, if a user wishes to record a memorable quote, stock information, sports statistics or scores, a brand name, a product name, or a name or title of a person appearing in a video program, the user may need to pause the video program (if possible) and write down the text information.

In one example, the present disclosure relates a customer premises-based device, such as a set-top box (STB) and/or a digital video recorder (DVR), or a "smart" television, or a network-based device, such as a video-on-demand (VoD) server, a "cloud" DVR, server, or other head-end device for broadcasting and/or streaming video programs that enables a user to export text appearing in a video program presented on a display screen, e.g., a television, monitor, or the like, to the user's computing device such as a mobile phone, tablet, laptop or personal computer (broadly, an "alternate destination"). In one example, the customer premises-based device or the network-based device may pause the current video program being presented, whether VoD programming, on-demand programming, or "live" programming, capture an image of the screen, and identify text on the screen using optical character recognition (OCR). The OCR may include any available algorithm in order to identify text from the image, or frame of the video program, such as: matrix matching, feature extraction, fuzzy logic, structural analysis, neural network-based techniques, and so forth. In one example, text that is recognized via OCR is presented via the display screen in a selectable format. For instance, the user may use a remote control or other control device to select one or more portions of OCR-recognized text for export to an alternate destination. In one example, the customer premises-based device or the network-based device may present the option of several different alternate destinations or identities (such as email addresses, mobile device identifiers or phone numbers, etc.) to which the text that is selected may be sent. In one example, one or more alternate destinations may be presented for selection by a user in accordance with a user identity. For instance, a customer premises-based device, such as a STB/DVR may identify a viewing user based upon a login, voice recognition, facial recognition, etc. In addition, the customer premises-based device and/or the network-based device may store associations between different alternative destinations and/or identifiers and the possible viewing user(s), or roles/identities which may be associated with the customer premises, such as parent(s), children, specific household members, etc. For example, when a first user is the viewer, the alternate destinations that are available may include the first user's mobile phone, the first user's email address or telephone number, etc. On the other hand, when a second user is the viewer, the alternate destinations that are available may include the second user's mobile phone, the second user's email address or telephone number, etc.

In addition, in one example, when the text comprises a web address, such as a uniform resource locator (URL), a telephone number, an email address, a hashtag, a social media identifier, or other contact identifier, an option may be provided via the display screen to the user to automatically open the web address, dial the phone number, create a draft message to the address or identifier, etc. from a device associated with an alternate destination that is selected. In such an example, the device associated with the alternate destination may include an application that is configured to receive an instruction from the customer premises-based device or the network-based device, and to authorize and perform an automated action of placing a call, opening a web address, etc. in accordance with the instruction. In one example, screen capturing may be performed locally, e.g., at the customer premises-based device, while the OCR may be performed at a network-based device. In such an example, OCR-detected text may be sent back to the customer premises-based device for presentation on the display screen for selection by the user.

In one example, the text that is selected may be sent to one or more alternate destinations via a local network, via peer-to-peer communication and/or via one or more telecommunication service provider networks depending upon the preference of a telecommunication service provider, a preference of a user and/or a subscriber account holder, the current location(s) or network connectivity of device(s) associated with available alternative destination(s), and so forth. In addition, in one example, an instruction may also be sent along with the selected text via a local network, via peer-to-peer communication and/or via one or more telecommunication service provider networks to device(s) associated with the one or more alternate destinations to take an automated action. For instance, where the text comprises a web address and is recognized as such, an option may be provided to the user to automatically access the web address via a smartphone, a tablet computer, a laptop computer, a desktop computer, etc. Similarly, in another example, when the text comprises a phone number, an option may be presented via the display screen for the user to have an automatic call placed to the telephone number or a draft text message created that is addressed to the telephone number via a smartphone that is chosen to receive the selected text. Accordingly, when such an option is selected by the user, an instruction may also be transmitted to a device associated with an alternate destination that is receiving the text to take an automated action in accordance with the option that is selected. These and other aspects of the present disclosure are described in greater detail below in connection with the examples of FIGS. 1-4.

Figure 1:
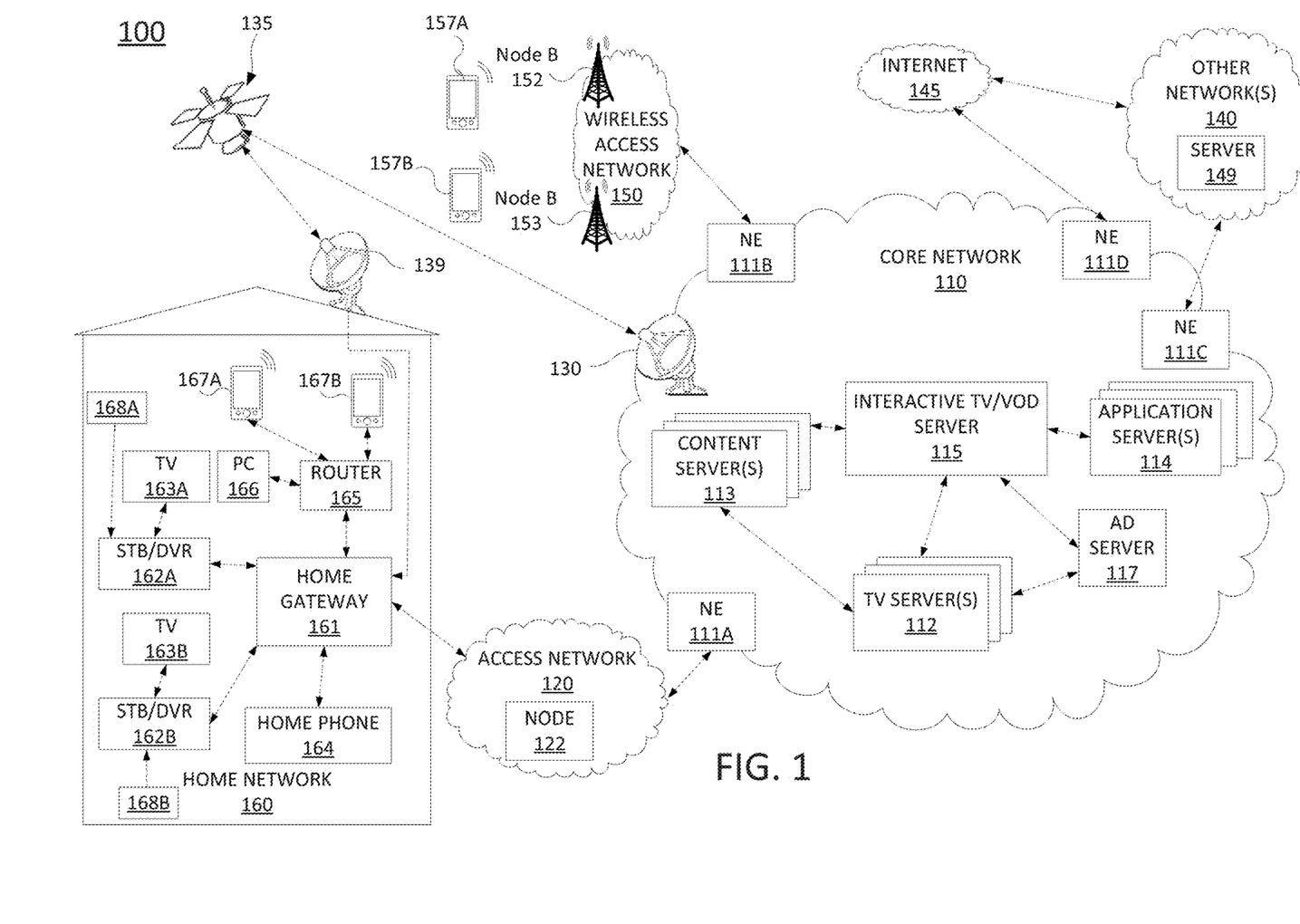
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices (e.g., customer premises-based devices) such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one embodiment, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, elements 152 and 153 may each comprise a Node B or evolved Node B (eNodeB).

In one embodiment, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one embodiment, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple-play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an interactive TV/VoD server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and interactive TV/VoD server 115 to select which video programs, or other content and advertisements to provide to the home network 160 and to others.

In one example, content servers 113 may store scheduled television broadcast video programs for a number of television channels, video-on-demand programming, local programming content, and so forth. For example, content providers may upload various video programs to the core network to be distributed to various subscribers. Alternatively, or in addition, content providers may stream various video programs to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various customer premises.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. Application servers 114 may further include business information database (BID) storage servers. For instance, the network operator of core network 110 may receive and store third-party information relating to subscribers. In one example, application servers 114 may include a network-based DVR server, or "cloud" DVR server, which may provide storage space for users to record, store, and playback video programming as an alternative to, or in addition to a customer premises-based DVR. It should be noted that the foregoing are only several examples of the types of relevant application servers 114 that may be included in core network 110 for storing information relevant to providing personalized content to a subscriber.

Figure 4:
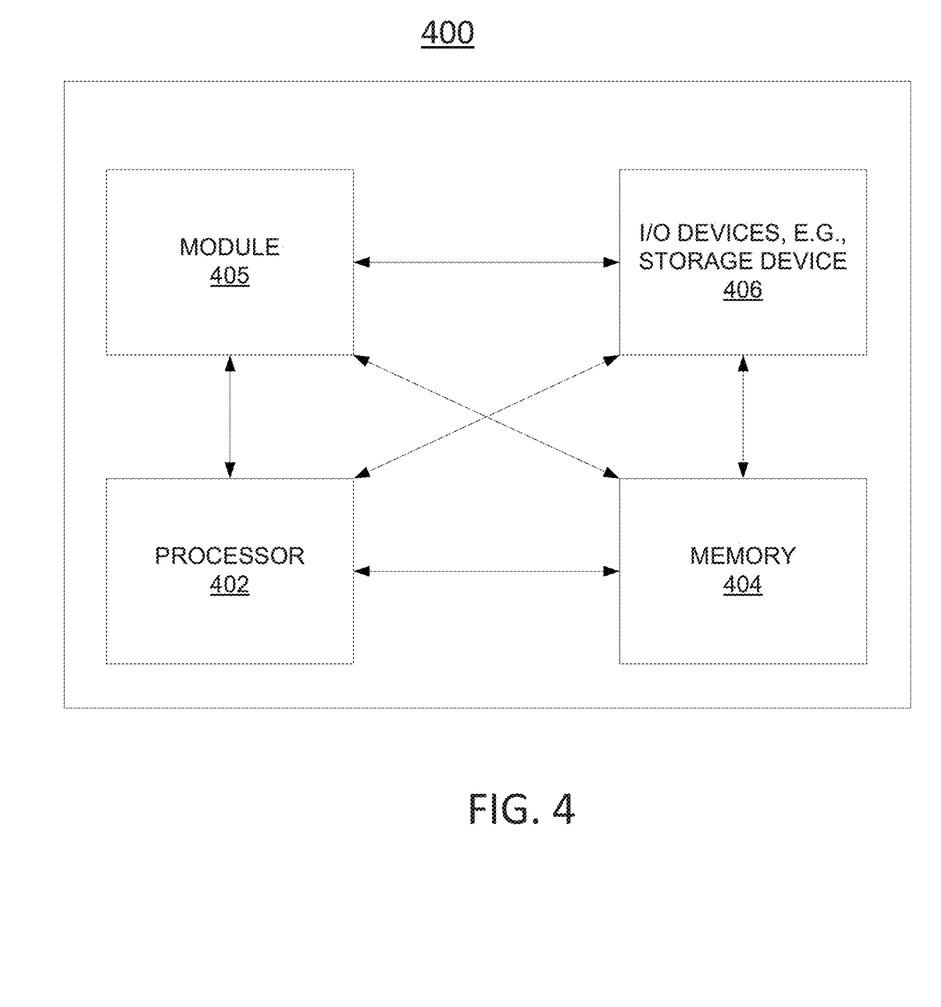
FIG. 4 illustrates a high level block diagram of a computing device specifically programmed to perform the steps, functions, blocks and/or operations described herein.

It should be noted that one or more of the above-described components of core network 110, such as TV servers 112, interactive TV/VoD server 115, one or more of application servers 114 functioning as a cloud DVR server, etc., may comprise a computing system or server, such as computing system 400 depicted in FIG. 4, and may be configured to provide one or more operations or functions for exporting text captured from a video program presented on a display screen using optical character recognition to an alternate destination, as described herein.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD), or the like. However, in another embodiment node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data (e.g., from TV servers 112, interactive TV/VoD server 115, application servers 114, etc.) is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, one or both of the STB/DVR 162A and STB/DVR 162B may comprise a computing system or server, such as computing system 400 depicted in FIG. 4, and may be configured to provide one or more operations or functions for exporting text captured from a display screen using optical character recognition to an alternate destination, as described herein. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

In one example, one or both of the STB/DVR 162A and STB/DVR 162B may host an operating system for presenting a user interface via TVs 163A and 163B, respectively. In one example, the user interface may be controlled by a user via a remote control 168A or 168B or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Similarly, the control devices may comprise gaming console controllers, wireless keyboards, handheld wireless computing devices, and so forth. In one example, the remote controls 168A and 168B may be push button-activated, touchpad-activated, voice command-activated, etc. In one example, remote controls 168A and 168B may record and transmit sound (e.g., voice commands), and send the recorded sound to STB/DVR 162A and/or STB/DVR 162B for processing to determine if any voice commands are contained within the recorded sound. In one example, one or both of the STB/DVR 162A and STB/DVR 162B may also be equipped to receive commands without the use of a remote control. For instance STB/DVR 162A and/or STB/DVR 162B may be configured to accept voice commands via an integrated or attached microphone, to accept gesture commands via an integrated or attached camera, to receive commands via input keys provided on the surfaces of STB/DVR 162A and/or STB/DVR 162B, and so forth. Accordingly, in one example, a "control device" may also include STB/DVR 162A and/or STB/DVR 162B.

In one example, the user interface may comprise a plurality of windows and/or menus which may be navigated by making various selections via inputs from a remote control 168A or 168B, or other control device. For instance, one or more windows and/or menus may provide a programming guide that lists channels and the programming that is playing or is scheduled to play on such channels. Channels and/or video programs listed in the programming guide may be selected to provide more detailed information regarding the channel and/or the program(s), such as cast and crew information, original air date information, rating information, upcoming show times, e.g., for repeat broadcasts of the same video program, and so forth. Channels and/or video programs may also be selected via the user interface upon which the STB/DVR 162A and/or STB/DVR 162B may tune to the channel that is selected, or tune to the channel of the video program that is selected. In addition, a remote control 168A or 168B, or other control device may be used to switch from channel to channel, e.g., without recalling the user interface to the display screen of the TV 163A or TV 163B. Another user interface window may provide a menu of options for recording video content to the STB/DVR 162A and/or STB/DVR 162B, or to a cloud DVR server, such as recording individual video programs or series, extending recording times, etc.

Another user interface screen may provide a menu of available selections for video-on-demand (VoD) video programs, such as listings by content provider/television channel, by category or content type, and so forth. In one example, the selections for video-on-demand (VoD) video programs may be obtained by STB/DVR 162A and/or STB/DVR 162B from interactive TV/VoD server 115. Another screen may provide a listing of available DVR video programs that is stored in the STB/DVR 162A and/or STB/DVR 162B, and/or within a cloud DVR server, e.g., one of application servers 114, and may provide various options that may be selected to playback recorded video programs, delete recorded video programs, and so forth. In one example, STB/DVR 162A and/or STB/DVR 162B may also provide a web browser for obtaining video programs from servers hosting such video programs, and for making such video programs available via the Internet 145. For instance, in one example, server 149 in other networks 140 may represent such a web server. In one example, the web browser may comprise a limited web browser that is restricted to accessing certain approved web sites providing video programs. Thus, STB/DVR 162A and/or STB/DVR 162B may present video programs that are stored locally (e.g., DVR video programs from STB/DVR 162A and/or STB/DVR 162B), or which may be received via a network, e.g., VoD programs, video programs recorded in a cloud DVR, web based video programs, e.g., Moving Picture Expert Group (MPEG) .mpeg files, .mov files, .mp4 files, or the like, IPTV video programs, and so forth.

In addition to various windows and/or menus, the user interface may also provide for audio interactions, or may include aspects which are overlaid over a video program that is being presented on TV 163A or TV 163B via one of STB/DVR 162A or STB/DVR 162B. For instance, the user interface may provide for interactive voice response (IVR) interactions in response to voice commands, or commands entered via a remote control, such as confirming a user's selection of a video program to play, a user's channel selection, a selection of whether to play a video program from the beginning or to resume at a point where viewing left off, etc. In one example, various commands, such as "stop", "pause", or the like may cause a bar indicating a timeline of a video program to appear indicating how much of the video program has already been viewed or indicating a current time within the video program where the stop or pause has occurred, a duration of time to the end of the video program, an overall duration of the video program, etc.

In general, the user interface may be presented via one of STB/DVR 162A or STB/DVR 162B, one of STB/DVR 162A or STB/DVR 162B in conjunction with one or more network-based devices, such as one or more of TV servers 112, interactive TV/VoD server 115, application servers 114 functioning as a cloud DVR server, etc. In addition, in one example, aspects of a user interface described in connection with STB/DVR 162A and STB/DVR 162B may also be provided via TVs 163A and 163B, e.g., when TV 163A and TV 163B are smart TVs.

As mentioned above, customer-premises based devices, such as STB/DVR 162A and STB/DVR 162B, and/or network-based devices, such as TV servers 112, interactive TV/VoD server 115, application servers 114 functioning as a cloud DVR server, etc., may be configured to provide one or more operations or functions for exporting text captured from a video program presented on a display screen using optical character recognition to an alternate destination, as described herein. To illustrate, a user viewing a video program on TV 163A via the STB/DVR 162A may use remote control 168A or other control device to pause the current video program being presented, whether VoD programming, on-demand programming, or "live" programming. In addition, the user may enter a command via remote control 168A or other control device to capture a frame from the video program, and to identify any text contained therein using optical character recognition (OCR). STB/DVR 162A may then perform an OCR on the captured frame. In one example, text that is recognized via OCR is presented via the TV 163A in a selectable format. For instance, the user may use remote control 168A or other control device to select one or more portions of OCR-recognized text for export to an alternate destination.

In one example, the STB/DVR 162A may present the option of several different alternate destinations or identities (such as email addresses, mobile device identifiers or phone numbers, etc.) to which the text that is selected may be sent. In one example, one or more alternate destinations may be presented for selection by the user in accordance with a user identity. For instance, STB/DVR 162A may identify the viewing user based upon a login, voice recognition, facial recognition, etc. In addition, the STB/DVR 162A may store, or have access to another customer premises-based or network-based device storing associations between different alternative destinations and/or identifiers and the possible viewing user(s), or roles/identities which may be associated with the customer premises, such as parent(s), children, specific household members, etc.

The text that is selected may be sent to one or more alternate destinations via a local network, via peer-to-peer communication and/or via one or more telecommunication service provider networks depending upon the preference of a telecommunication service provider, a preference of a user and/or a subscriber account holder, the current location(s) or network connectivity of device(s) associated with available alternative destination(s), and so forth. For example, a user may select a telephone number associated with mobile device 167A as an alternate destination to receive the text. In one example, STB/DVR 162A may send a communication to core network 110 including the text for transmission to mobile device 167A, using the phone number associated with mobile device 167A as the destination. Thus, the communication may be forwarded from core network 110 to mobile device 167A via access network 120 and home network 160, or via wireless access network 150, for example. However, in another example, STB/DVR 162A may determine that mobile device 167A is also within home network 160 (e.g., also connected to router 165) or is within communication range for infrared communications, IEEE 802.15 based communications, or other short-range peer-to-peer communications. Thus, in another example, STB/DVR 162A may send the text to mobile device 167A without routing a communication through core network 110.

In addition, in one example, when the text comprises a web address, such as a uniform resource locator (URL), a telephone number, an email address, a hashtag, a social media identifier, or other contact identifier, an option may be provided by STB/DVR 162A via TV 163A to the user to automatically open the web address, dial the phone number, create a draft message to the address or identifier, etc. from a device associated with an alternate destination that is selected. In such an example, the device associated with the alternate destination may include an application that is configured to receive an instruction, and to authorize and perform an automated action in accordance with the instruction. Thus, in one example, STB/DVR 162A may also send an instruction along with the selected text to mobile device 167A to take an automated action. For instance, if the text comprises a phone number, an option may be presented via the TV 163A for the user to have an automatic call placed to the telephone number. Accordingly, when such an option is selected by the user, an instruction may also be transmitted to mobile device 167A to automatically place a call to the telephone number. In turn, the mobile device 167A may then place the call, e.g., via wireless access network 150 to the telephone number.

It should be noted that the foregoing describes only a few of the options that may be provided in accordance with the present disclosure. In addition, the forwarding of text and/or instructions to mobile device 167A is just one example. For instance, in another example, text may be forwarded to a telephone number associated with mobile device 157A, which may cause the text to be sent via a communication from STB/DVR 162A through access network 120, core network 110 and wireless access network 150. In still another example, the text may be forwarded to more than one destination, such as to both PC 166 and mobile device 157B. In addition, in one example, functions described above in connection with STB/DVR 162A may be similarly performed by STB/DVR 162B, or by a network-based device, such as interactive TV/VoD server 115, a cloud DVR server, etc. In still another example, screen/frame capturing may be performed locally, e.g., via STB/DVR 162A or STB/DVR 162B, while the OCR may be performed at a network-based device. In such an example, OCR-detected text may be sent back to the STB/DVR 162A or STB/DVR 162B for presentation on TV 163A or TV 163B for selection by a user. Thus, these and other variations are all contemplated within the scope of the present disclosure.

Further details regarding the functions that may be implemented by interactive TV/VoD server 115, STBs/DVRs 162A and 162B, mobile devices 157A, 157B, 167A and 167B, and/or PC 166 are discussed in greater detail below in connection with the examples of FIG. 2 and FIG. 3. In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
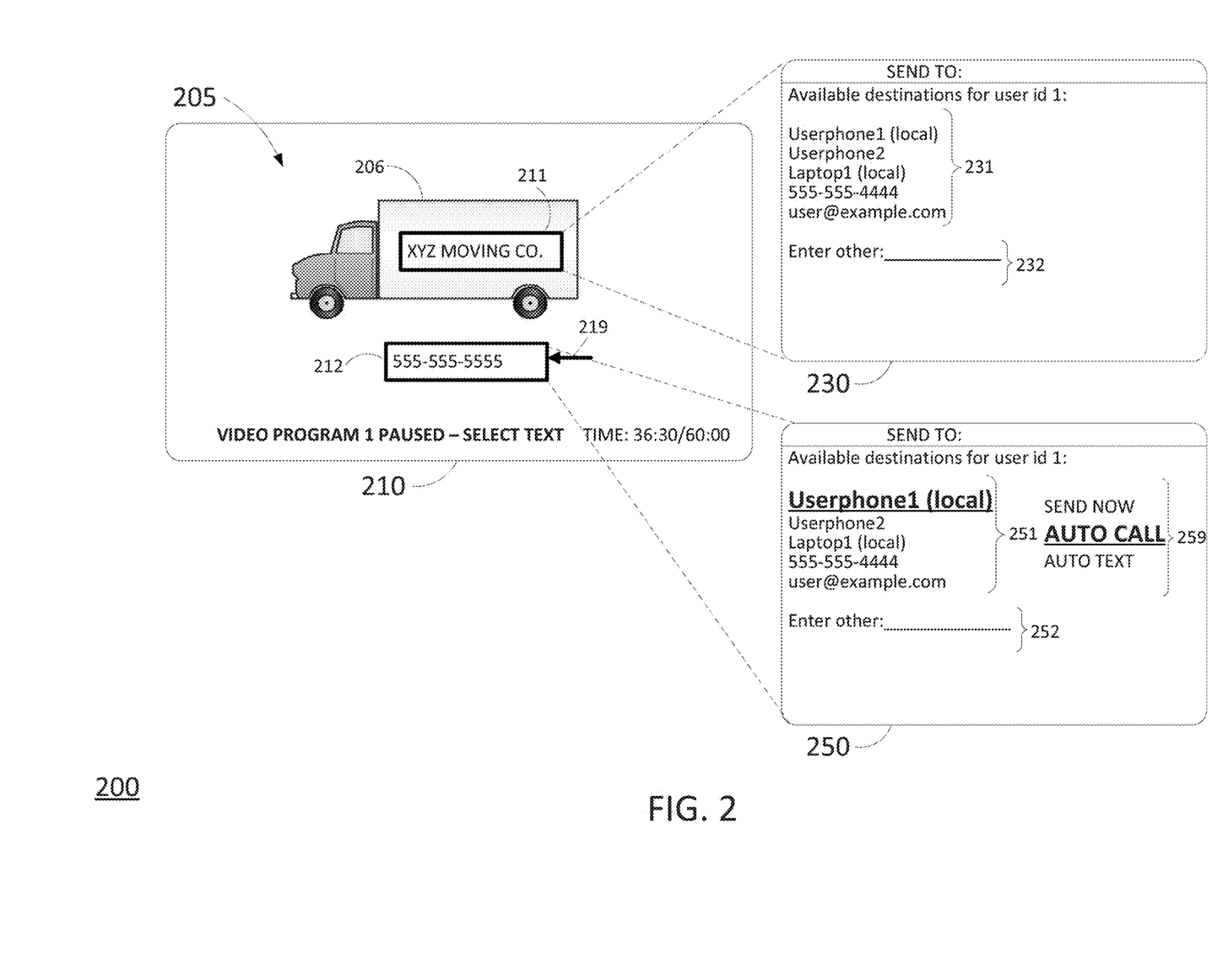
FIG. 2 illustrates an example user interface for exporting text captured from a video program presented on a display screen using optical character recognition to an alternate destination, in accordance with the present disclosure.

To further aid in understanding the present disclosure, FIG. 2 illustrates example windows of a user interface 200 for exporting text captured from a video program presented on a display screen using optical character recognition to an alternate destination. For instance, windows 210, 230, and 250 may be presented on a display screen, such as on TV 163A or TV 163B of FIG. 1. In addition, windows 210, 230, and 250 may be presented by STBs/DVR 162A or STB/DVR 162B, by interactive TV/VoD server 115, by one of application servers 114, or by one or more of such devices in coordination, such as by STB/DVR 162A in conjunction with interactive TV/VoD server 115.

As illustrated in FIG. 2, a video program, "video program 1", may be playing via window 210 on a display screen and may be paused at a frame 205 as illustrated. For instance, frame 205 may be a frame at 36 minutes and 30 seconds into a 60 minute long video program. Within the frame 205 there may be a moving truck 206 with "XYZ Moving Co." written on the side of truck 206, along with a phone number "555-555-5555" presented near the bottom center of the frame 205. In addition, an option for optical character recognition (OCR) may be selected (such as by a user enter a command via a remote control or other control device) which may cause the text "XYZ Moving Co." and "555-555-5555" to be recognized/detected within the frame 205. In one example, the text that is recognized may be indicated with boxes or other identifiers added to the window 210, e.g., boxes 211 and 212. However, in other, further, and different examples, the text that is recognized via OCR may be indicated in a different manner, such as by highlighting, presenting the text in a different color than the text originally appears in the frame 205, and so forth. In one example, the user interface 200 via the window 210 may provide an option for a user to select text that is identified. For instance, a user may use arrow keys on a remote control, or use other input keys via a remote control or other control device to move from one portion of text to another. As illustrated in the example of FIG. 2, an arrow 219 may indicate a current selection of text by the user. In one example, the selection of text may be confirmed, e.g., by a user pressing an "enter" key on a remote control, or by providing a similar command via the remote control or other control device.

In one example, the user interface 200 may include opening additional windows, e.g., window 230 and/or window 250, in response to a selection of text and/or in response to a confirmation of a selection of text. For instance, if a user moves arrow 219 to select the text in box 211, window 230 may be opened by overlaying window 230 over window 210 or may cause a split screen or shared screen, where both window 210 and window 230 are presented via the display screen. In the present example, window 230 provides a number of options for selecting one or more alternative destinations to send the text in box 211. For instance, a first section 231 may present automatically identified destinations of telephone Userphone1, telephone Userphone2, computer Laptop1, telephone number 555-555-4444, and email user@example.com. In one example, the indication of "local" also identifies which destinations may be within a same local network (e.g., at a same customer premises) as the display screen. In this case, Userphone1 and Laptop1 are "local" devices. In one example, the "local" devices populated in the first section 231 may be detected by performing a peer discovery on a local network.

In one example, the devices populated in the first section 231 may also be in accordance with an identity of a viewing user. For instance, a user may provide a login and password or otherwise identify to the device implementing user interface 200 that the current viewing is associated with "user id 1". For instance, "user id 1" may be associated with an account holder or primary subscriber of a household, while other household members may have different user identifiers. In addition, the user may designate one or more additional destinations that are locatable using different contact identifiers, such as a telephone number or device identifier, such as a media access control (MAC) address, an email address, a telephone number, and so forth, that the user authorizes to receive text identified via OCR in accordance with the present disclosure. Thus, when identifying text in a video program via OCR in accordance with the present disclosure, alternate destinations that are associated with the identity of the viewing user(s) may be presented in connection with the option to select text for exporting to such alternate destinations. However, a second section 232 may provide an option for entering another destination, e.g., using a remote control keypad, or a soft keypad (not shown) that may be presented via the user interface 200.

In the example of FIG. 2, the user may currently select the text in box 212, as indicated by the arrow 219. Thus, the window 250 may be presented in accordance with the selection. Window 250 is similar to window 230 and includes a first section 251 with a list of available alternate destinations, and a second section 252 with an option to enter a different alternate destination. In one example, in addition to identifying text via OCR, examples of the present disclosure may further identify special text, such as email addresses, hashtags, telephone numbers, other contact identifiers, such as social media usernames, and so forth. Special text may be identified in any number of ways, such as recognizing a series of 10 numbers (e.g., in North America) as a dial-able telephone number, recognizing area codes/numbering plan areas (NPAs) as three of the ten number segregated by parenthesis, recognizing the three-digit exchange (NXX) and four-digit subscriber number portions of a potential telephone number separated by a hyphen, recognizing an email address as groups of characters comprising a username and domain respectively, punctuated by an "@" symbol, possibly accompanied by a dot "." separating the domain of the email address from a top level domain (e.g., ".com", ".org", etc.), recognizing a web address by determining a sequence of characters followed by a well-known top level domain, and so forth.

In the present example, the text in box 212 clearly comprises telephone number 555-555-5555. Accordingly, in one example, in the window 250, at least a portion of the available alternate destinations may be offered along with an option for an automated action (e.g., to automatically place a call to the telephone number or to automatically create a draft text message to the telephone number) via device(s) associated with the alternate destination(s). For instance, an option for an automatic placement of a telephone call may be presented where a device is known to be associated with an alternate destination and where the device is also known to be capable of receiving instructions and carrying out the automatic placement of a telephone call in accordance with the instructions. In the present example, the user may have a current selection of Userphone 1, a local device from the list of available alternate devices presented in the first section 251. The Userphone 1 may be known to be a smartphone that is configured to be able to receive and execute instructions for an automatic phone call. For instance, the user associated with "user id 1", or a different user may provide an input to Userphone1 to authorize Userphone1 to receive and trust instructions from the device providing the user interface 200. Thus, the option for an automatic call via Userphone1 is provided in section 259 of the window 250. It can be seen that the option is currently highlighted for selection, as indicated by "AUTO CALL" being bolded and underlined, as compared to the other options of "SEND NOW" (e.g., to send the text to Userphone1 without instructions for an automated action), or "AUTO TEXT" (e.g., to send the text to Userphone1 with an instruction to automatically create a draft text message to the telephone number 555-555-5555 that is identified in the text of box 212).

Different options may be presented in section 259 depending upon the type of special text that is identified and/or depending upon the nature of the alternate destination that is currently selected. For example, if a user were to change a current selection for an alternate destination from Userphone1 to the email address user@example.com, options for automated actions may be not presented in the section 259. For instance, if there is no specific device that is known to be associated with the email address, it may not be possible to provide an instruction for an automated action of placing an automatic phone call. For instance, the text may be sent as an email to the email address, where the email may simply sit on an email server until retrieved by the user via any device. Similarly, if the alternate destination is selected to be Laptop1, if Laptop1 is known to be without telephony capability or has unknown capabilities, an option for automatically placing a call may also be suppressed.

In addition, for ease of illustration, the foregoing example(s) describe the selection of a single alternate destination. However, it should be understood that in one example, multiple alternate destinations may be selected for receiving the same text that is identified in a frame of a video program via OCR and that is selected for export. In another example, user interface 200 may include a pointer that can be controlled via a remote control or other control device to navigate within window 210 and to hover over boxes 211 and/or 212. The text in either of boxes 211 or 212 may then be selected by clicking or pressing an "enter" key, a "select" key, or the like. In still another example, commands and/or selections may be provided by a user via voice command, or other input, such as gestures captured via a video camera and recognized via a gesture recognition module, and so forth. Thus, these and other variations are all contemplated within the scope of the present disclosure.

Figure 3:
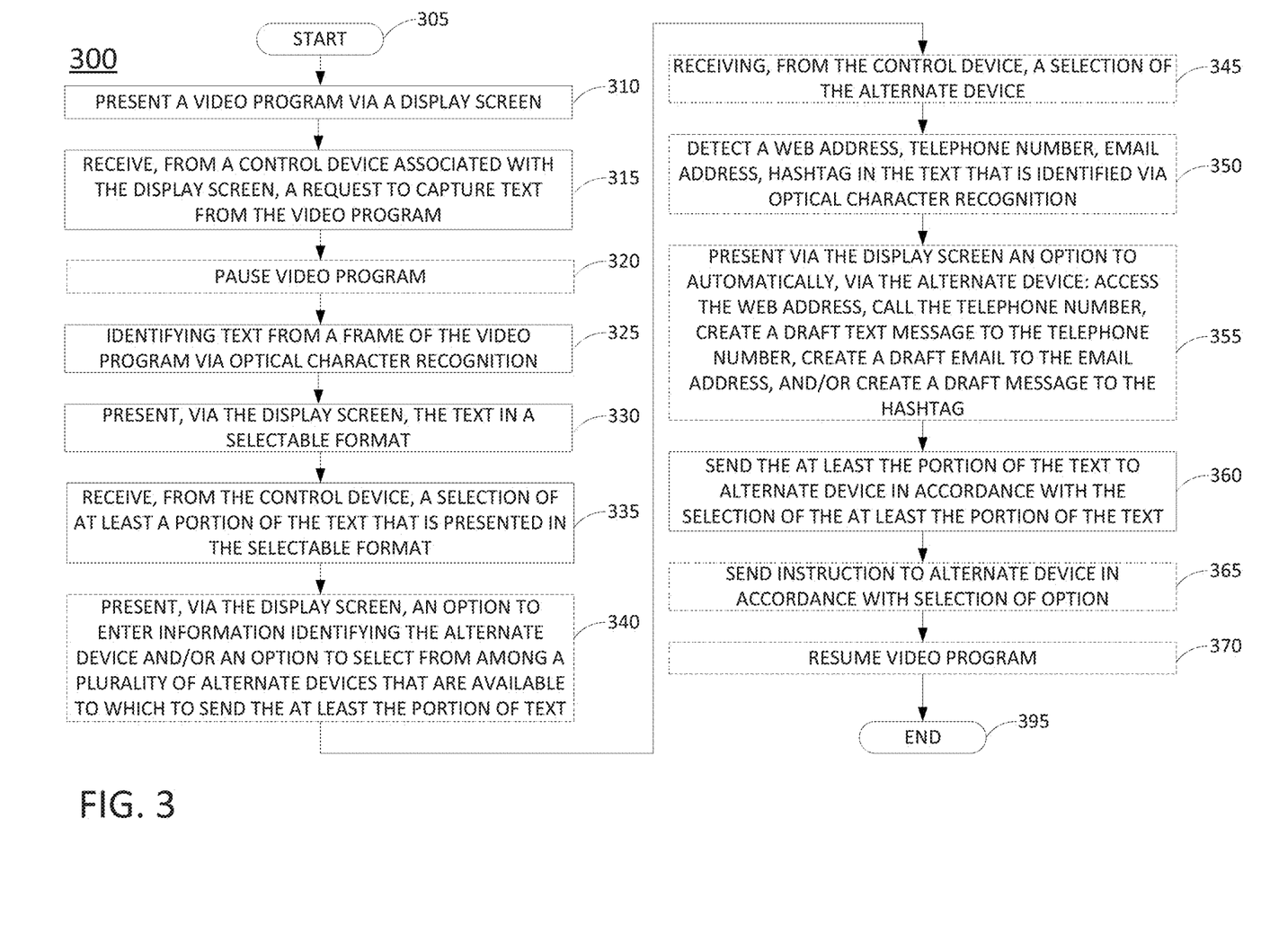
FIG. 3 illustrates a flowchart of an example method for exporting text captured from a video program presented on a display screen using optical character recognition to an alternate destination, in accordance with the present disclosure.

FIG. 3 illustrates a flowchart of a method 300 for exporting text captured from a video program presented on a display screen using optical character recognition to an alternate destination, in accordance with the present disclosure. In one example, the method 300 is performed by a network-based device such as the interactive TV/VoD server 115 of FIG. 1, any one or more components thereof (e.g., a processor performing operations stored in and loaded from a memory), by the interactive TV/VoD server 115 in conjunction with one or more other devices, such as application servers 114 functioning as data storage devices, STB/DVR 162A or STB/DVR 162B, TVs 163A and 163B, and so forth, or by one of application servers 114 functioning a network-based DVR. In still another example, the method 300 may be performed by a customer premises-based device, such as STB/DVR 162A, STB/DVR 162B, one of the TVs 163A and 163B, and so forth. In one example, the steps, functions, or operations of method 300 may be performed by a computing device or system 400, and/or processor 402 as described in connection with FIG. 4 below. For instance, the computing device or system 400 may represent any one or more components of FIG. 1 that are configured to perform the steps, functions and/or operations of the method 300. For illustrative purposes, the method 300 is described in greater detail below in connection with an example performed by a processor, such as processor 402. The method 300 begins in step 305 and proceeds to step 310.

At step 310, the processor presents a video program via a display screen. The video program may comprise VoD programming, on-demand programming, or "live" programming, for example. The video program may be streamed or broadcast from one or more network-based devices, or may be played back from a customer premises-based device. In one example, the processor may be integrated within such a customer-premises based device or network-based device. The screen display may be attached to and/or in communication with a customer premises-based device, such as a television attached to a set-top box (STB), a digital video recorder (DVR) and/or a STB/DVR combo. In addition, the processor may comprise a processor of a customer premises-based device, e.g., a set-top box, a digital video recorder, and/or a combination device, or a processor of a device deployed in a telecommunication network, e.g., a VoD server, a DVR server, or similar network-based device.

At step 315, the processor receives, from a control device associated with the display screen, a request to capture text from the video program. For example, the user may press a dedicated button on a remote control or other control device to indicate an intention to capture and export text from the video program to one or more alternate destinations. In one example, a user may press a "pause" or "stop" button to cause the video program to be stopped and/or paused, upon which the processor may present, via the display screen, an option to capture text. In one example, the option may be presented on the display screen as a standalone option. In another example, the option may be presented in a menu of different options. Accordingly, the user may select the option to capture the text by navigating to the option, e.g., using arrow keys on a remote control and pressing an "enter" key, "OK" key, or the like, or by using voice command(s), etc.

At optional step 320, the processor may pause the video program. For instance, in one example, the video program may be paused or stopped while additional steps of the method 300 are performed. However, in another example, the video program may continue in a background, or may be presented in a smaller window on the display screen, while additional portions of the display screen are used to present aspects of a user interface for assisting a user in making selections and/or providing commands/inputs in accordance with the method 300. Alternatively, or in addition, a command may first be received to pause the video program, in response to which the processor may present an option to perform optical character recognition on the frame of the video program at which the video program is paused.

At step 325, the processor identifies text from a frame of the video program via optical character recognition (OCR). The processor may use any available OCR algorithm in order to identify text from the frame, such as: matrix matching, feature extraction, fuzzy logic, structural analysis, neural network-based techniques, and so forth.

At step 330, the processor presents, via the display screen, the text from the frame in a selectable format, when the text from the frame is identified via OCR. For instance, the text that is identified at step 325 may be indicated with boxes or other identifiers surrounding the text on the display screen. In another example, the text that is identified at step 325 may be indicated in a different manner, such as by highlighting, presenting the text in a different color than the text originally appears in the frame, and so forth.

In one example, the processor may provide an option for a user to select at least a portion of the text that is identified (e.g., all or a portion of the text that is identified). For instance, a user may use arrow keys on a remote control, or use other inputs keys via a remote control or other control device to move from one portion of text to another. For example, a current selection of text by the user may be indicated by a bolding of the text, a presentation of the text in a different color than other text, underlining, highlighting, and so forth.

At step 335, the processor receives, from the control device, a selection of at least a portion of the text that is presented in the selectable format. For example, the selection of the at least the portion of the text may be confirmed, e.g., by a user selecting the at least the portion of the text as described above and then pressing an "enter" key on a remote control, or by providing a similar command via the remote control or other control device that is received by the processor.

At optional step 340, the processor may present, via the display screen, an option to enter information identifying the alternate destination and/or present, via the display screen, a plurality of alternate destinations that are available to which to send the at least the portion of the text. For example, the choices may be presented in the same or a similar manner as described above in connection with the window 230 and/or window 250 of FIG. 2. In one example, all or part of the text selected by the user can also be edited or annotated on-screen before exporting to the alternate destination(s). In addition, in one example, an option may also be presented for other information regarding the video program and/or the current frame to be included along with the selection of the text, such as a channel name, a program title, a current date and time, an original air date or release date, etc. The additional information may be made available via an electronic programming guide, for example.

At optional step 345, the processor may receive, from the control device, a selection of the alternate destination. For instance, the selection may be made by navigating through a menu of available alternate destinations presented on the display screen using arrow keys and pressing an "enter" key on a remote control or other control device. Alternatively, the user may enter an alternate destination via a control device, e.g., as described above in connection with section 252 of the window 250 of FIG. 2. In one example, optional step 345 may further include a selection of additional information to be included along with the selected text.

At optional step 350, the processor may detect a web address, a telephone number, an email address, a hashtag, or other contact identifier in the text that is identified via OCR. For example, in addition to identifying text via OCR, the processor may further identify special text in any number of ways, such as recognizing a series of 10 numbers (e.g., in North America) as a dial-able telephone number, recognizing area codes/numbering plan areas (NPAs) as three of the ten number segregated by parenthesis, recognizing the three-digit exchange (NXX) and four-digit subscriber number portions of a potential telephone number separated by a hyphen, recognizing an email address as groups of characters comprising a username and domain respectively, punctuated by an "@" symbol, possibly accompanied by a dot "." separating the domain of the email address from a top level domain, recognizing a web address by determining a sequence of characters followed by a well-known top level domain, and so forth.

At optional step 355, the processor may present via the display screen an option for an automated action which may depend upon the particular type of contact identifier that is detected. For instance, when the contact identifier that is detected is a web address, the option that is presented may comprise an option to automatically access the web address via a device associated with the alternate destination. When the contact identifier that is detected is a telephone number, the option that is presented may comprise an option to automatically place a call to the telephone number and/or to automatically create a draft text message to the telephone number via a device associated with the alternate destination. Similarly, when the contact identifier that is detected is an email address, the option that is presented may comprise an option to automatically create a draft email to the email address via a device associated with the alternate destination. In still another example, when the contact identifier that is detected is a hashtag, the option that is presented may comprise an option to automatically create a draft message to the hashtag via a device associated with the alternate destination At step 360, the processor sends the at least the portion of the text to an alternate destination in accordance with the selection of the at least the portion of the text. In one example, the at least the portion of the text may be sent to one or more alternate destinations in accordance with a selection or entry made in response to the choices presented at optional step 340 and received at optional step 345. In one example, the at least the portion of the text may be sent in accordance with a delivery mode, or format that is selected by a user. In another example, the delivery mode/format may be selected based upon the type of destination and/or based upon a user profile of the user that is viewing the video program. For instance, if an alternate destination is an email address, the at least the portion of the text may be sent to the alternate destination via an email. If an alternate destination is a smartphone, the at least the portion of the text may be sent to the alternate destination via a text message. In still another example, the at least the portion of the text may be sent in a different format, such as an Extensible Markup Language (XML) container, a Java Script Object Notation (JSON) container, a Simple Object Access Protocol (SOAP) message, and so forth. In one example, additional information selected in accordance with optional steps 340 and 345 may also be included along with the at least the portion of the text. In one example, when an alternate destination is associated with a particular device, or devices, the device(s) may be configured to receive the at least the portion of the text in the format in which the at least the portion of the text is sent. In addition, the at least the portion of the text may be sent to one or more alternate destinations via communications within a local network or via peer-to-peer communications, or via one or more other networks, e.g., via an access network, a telecommunication service provider network, a cellular network, etc.

At optional step 365, the processor may send an instruction to the device associated with the alternate destination to perform an automated action. For instance, when an option that is presented at optional step 355 is selected, the instruction that is sent at optional step 365 may be in accordance with the selection of the option, such as an instruction to automatically (e.g., without further user input): access a web address, place a call to a telephone number, create a draft text message to the telephone number, create a draft email to an email address, create a draft message to a hashtag, and so forth. In one example, the instruction may be included in a same message/communication as the at least the portion of the text that is sent at optional step 360. In another example, the instruction may be sent as a separate message/communication either before or after the at least the portion of the text is sent at step 360. In such case, the instruction may be sent in any one of the delivery modes/formats noted above in connection with step 360, or in a similar format. In one example, where the option that is selected is to automatically access a web address, the processor may first check the web address against any one or several lists, such a list of web addresses known to be associated with malware, fraud, phishing scams, or other undesirable content, and may refrain from sending the instruction to the alternate destination to automatically access the web address if there is a problem.

At optional step 370, the processor may resume the video program. For instance, the video program may be un-paused in response to the completion of any one of steps 335-365, or in response to a command, e.g., from a remote control or other control device to un-pause the video program and/or to resume playing the video program.

Following any one of step 360, optional step 365, or optional step 370, the method 300 proceeds to step 395 where the method ends.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device specifically programmed to perform the functions described herein. For example, any one or more components or devices illustrated in FIG. 1 or described in connection with the method 300 may be implemented as the system 400. As depicted in FIG. 4, the system 400 comprises a hardware processor element 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for exporting text captured from a video program presented on a display screen using optical character recognition to an alternate destination, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 405 for exporting text captured from a video program presented on a display screen using optical character recognition to an alternate destination (e.g., a software program comprising computer-executable instructions) can be loaded into memory 404 and executed by hardware processor element 602 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for exporting text captured from a video program presented on a display screen using optical character recognition to an alternate destination (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:
1. A device, comprising:
a processor; and
a computer-readable medium storing instructions which, when executed by the processor, cause the processor to perform operations, the operations comprising:
presenting a video program via a display screen of a user;
receiving, from a control device associated with the display screen, a request to capture text from the video program;
identifying text from a frame of the video program via optical character recognition;

presenting, via the display screen, the text from the frame in a selectable format, when the text from the frame is identified via the optical character recognition;

receiving, from the control device, a selection of at least a portion of the text that is presented in the selectable format;

presenting, via the display screen, a plurality of alternate destinations that are available to which to send the at least the portion of the text;

receiving, from the control device, a selection of an alternate destination from among the plurality of alternate destinations, wherein the alternate destination is identified by a first telephone number; and sending the at least the portion of the text in a textual format to the alternate destination via the first telephone number in accordance with the selection of the at least the portion of the text and the selection of the alternate destination, wherein the alternate destination comprises a computing device of the user, wherein the computing device and the display screen are different devices.

2. The device of claim 1, wherein the operations further comprise:
presenting, via the display screen, an option to enter information identifying the alternate destination.

3. The device of claim 1, wherein each of the plurality of alternate destinations is selected for presenting in accordance with an identity of a viewer of the display screen.

4. The device of claim 1, wherein the operations further comprise:
detecting a web address in the text that is identified via the optical character recognition; and
presenting via the display screen an option to automatically access the web address via the computing device of the user in response to the selection of the alternate destination.

5. The device of claim 4, wherein the operations further comprise:
sending an instruction to the computing device of the user to automatically access the web address when the option is selected.

6. The device of claim 1, wherein the control device comprises a remote control.

7. The device of claim 1, wherein the operations further comprise:
detecting a second telephone number in the text that is identified via the optical character recognition; and
presenting via the display screen an option to automatically call the second telephone number via the computing of the user in response to the selection of the alternate destination.

8. The device of claim 7, wherein the operations further comprise:
sending an instruction to the computing device of the user to automatically place a call to the second telephone number when the option is selected.

9. The device of claim 1, wherein the operations further comprise:
detecting a second telephone number in the text that is identified via the optical character recognition; and
presenting via the display screen an option to automatically create a draft text message to the second telephone number via the computing device of the user in response to the selection of the alternate destination.

10. The device of claim 9, wherein the operations further comprise:

sending an instruction to the computing device of the user to automatically create the draft text message to the second telephone number when the option is selected.

11. The device of claim 1, wherein the operations further comprise:
detecting an email address in the text that is identified via the optical character recognition; and
presenting via the display screen an option to automatically create a draft email to the email address via the computing device of the user in response to the selection of the alternate destination.

12. The device of claim 11, wherein the operations further comprise:
sending an instruction to the computing device of the user to automatically create the draft email to the email address when the option is selected.

13. The device of claim 1, wherein the operations further comprise:
detecting a hashtag in the text that is identified via the optical character recognition; and
presenting via the display screen an option to automatically create a draft message to the hashtag via the computing device of the user in response to the selection of the alternate destination.

14. The device of claim 13, wherein the operations further comprise:
sending an instruction to the computing device of the user to automatically create the new draft message to the hashtag when the option is selected.

15. A non-transitory computer-readable medium storing a plurality of instructions which, when executed by a processor, cause the processor to perform operations, the operations comprising:
presenting a video program via a display screen of a user;
receiving, from a control device associated with the display screen, a request to capture text from the video program;
identifying text from a frame of the video program via optical character recognition;
presenting, via the display screen, the text from the frame in a selectable format, when the text from the frame is identified via the optical character recognition;
receiving, from the control device, a selection of at least a portion of the text that is presented in the selectable format;
presenting, via the display screen, a plurality of alternate destinations that are available to which to send the at least the portion of the text;
receiving, from the control device, a selection of an alternate destination from among the plurality of alternate destinations, wherein the alternate destination is identified by a first telephone number; and
sending the at least the portion of the text in a textual format to the alternate destination via the first telephone number in accordance with the selection of the at least the portion of the text and the selection of the alternate destination, wherein the alternate destination comprises a computing device of the user, wherein the computing device and the display screen are different devices.

16. A method, comprising:
presenting, by a processor, a video program via a display screen of a user;
receiving, by the processor from a control device associated with the display screen, a request to capture text from the video program;
identifying, by the processor, text from a frame of the video program via optical character recognition;

presenting, by the processor via the display screen, the text from the frame in a selectable format, when the text from the frame is identified via the optical character recognition;

receiving, by the processor from the control device, a selection of at least a portion of the text that is presented in the selectable format;

presenting, by the processor via the display screen, a plurality of alternate destinations that are available to which to send the at least the portion of the text;

receiving, by the processor from the control device, a selection of an alternate destination from among the plurality of alternate destinations, wherein the alternate destination is identified by a first telephone number; and sending, by the processor, the at least the portion of the text in a textual format to the alternate destination via the first telephone number in accordance with the selection of the at least the portion of the text, wherein the alternate destination comprises a computing device of the user, wherein the computing device and the display screen are different devices.

17. The method of claim 16, wherein the processor comprises a processor of a set top box or a digital video recorder.

18. The method of claim 16, wherein the processor comprises a processor of a video on demand server or a digital video recorder server deployed in a telecommunication network.

* * * * *